(12) United States Patent
Heo

(10) Patent No.: US 6,252,315 B1
(45) Date of Patent: Jun. 26, 2001

(54) MAGNET FIXING STRUCTURE FOR LINEAR MOTOR

(75) Inventor: Jong-Tae Heo, Seoul (KR)

(73) Assignee: LG Electronics, Inc. (KR)

( * ) Notice: Subject to any disclaimer, the term of this patent is extended or adjusted under 35 U.S.C. 154(b) by 0 days.

(21) Appl. No.: 09/208,699

(22) Filed: Dec. 10, 1998

(30) Foreign Application Priority Data

Dec. 10, 1997 (KR) .................................................. 97-67496

(51) Int. Cl.[7] .................................................. H02K 41/00
(52) U.S. Cl. .................................................. 310/12
(58) Field of Search .................... 310/12, 13, 14, 310/15, 190, 152; 335/222

(56) References Cited

U.S. PATENT DOCUMENTS 4,549,341 * 10/1985 Kasabian .................. 29/598
5,353,491 * 10/1994 Gentry et al. .................. 29/596
5,642,088 * 6/1997 Unger .................. 335/222
5,751,075 * 5/1998 Kwon et al. .................. 310/12
6,097,125 * 8/2000 Park et al. .................. 310/156

* cited by examiner

Primary Examiner—Nestor Ramirez
Assistant Examiner—Guillermo Perez
(74) Attorney, Agent, or Firm—Ostrolenk, Faber, Gerb & Soffen, LLP

(57) ABSTRACT

A magnet fixing structure for a linear motor including a a plurality of magnets inserted into a magnet paddle connected to a piston, and a magnet fixing ring attaching the same onto the outer periphery of the magnets under pressure, includes a plurality of eddy current loss prevent slits formed in slant along the periphery of the magnet fixing ring, or a plurality of eddy current loss prevent pores formed along the periphery of the magnet fixing ring. The structure minimizes the widening of the slits which may be caused by magnet fluctuation, thereby improving motor efficiency.

4 Claims, 3 Drawing Sheets

MAGNET FIXING STRUCTURE FOR LINEAR MOTOR

BACKGROUND OF THE INVENTION

1. Field of the Invention

The present invention relates to a linear motor, and more particularly, to an improved magnet fixing structure for a linear motor, wherein a pair of eddy current loss preventing slits are formed in slant, or a plurality of eddy current loss preventing pores, e.g., are formed, along an outer periphery of a magnet fixing ring which fixes the magnet into a magnet paddle so as to minimize the widening of each slit of the magnet fixing ring, thereby strengthening the fixture of the magnet into the magnet paddle.

2. Description of the Background Art

As shown in FIG. 1A, a moving magnet type motor is connected to a piston (not shown) of a linear compressor. A magnet M is connected into a magnet paddle 1 disposed between an inner lamination 3 and an outer lamination 4 which face against each other. The magnet M makes a high speed linear reciprocal movement between the two laminations 3, 4 in accordance with a magnetic field induced between the inner and outer laminations 3, 4, thereby driving the piston (not shown) connected thereto.

In order for the magnet paddle 1 to constantly make a high speed linear reciprocal movement in such a linear motor, the magnet M should be firmly fixed into the magnet paddle 1 without being deviated therefrom or fluctuated therealong.

Therefore, the magnet fixing structure for a linear motor serves to rigidly fix the magnet M into the magnet paddle 1 so as to prevent the magnet M from being deviated from the magnet paddle 1, thereby determining motor efficiency and reliability during a linear motor design.

According to such a conventional linear motor, a thin cylindrical magnet fixing ring 2 is fixed onto an inner periphery or outer periphery of the magnet M which is fixed into the magnet paddle 1 so as to maintain a stabilized fixture of the magnet M into the magnet paddle 1.

With reference to the accompanying drawings, the magnet fixing structure for the conventional linear motor will now be described.

As shown in FIGS. 1A and 1B, a plurality of magnet insert openings 1a are formed in and along the outer periphery of the cylindrical magnet paddle 1 which has both ends thereof opened and which is thinner than the magnet M so as to be inserted thereinto by the magnet M. The magnet fixing ring 2 is in a cylindrical shape with its both ends opened so as to tightly fix the magnet M into the magnet paddle 1, wherein the magnet M is inserted under pressure into an outer periphery of the magnet paddle 1 as shown in the drawing or an inner periphery of the magnet fixing ring 2.

Referring to FIG. 1B, in order to prevent the magnet M from being overinserted by the pressure of the magnet fixing ring 2 into the opening 1a of the magnet paddle 1 when the magnet M is fixed into the magnet paddle 1 by the magnet fixing ring 2, the magnet M includes a protrusion extended from each side thereof along the peripheral direction of the magnet paddle 1.

Also, as shown in FIG. 2, a plurality of eddy current loss preventing slits 2a, 2a' are formed along an axial direction in the periphery of the cylindrical magnet fixing ring 2 which is a non-magnetic body, so as to prevent the loss of eddy current occurring due to a magnetic induced between the respective laminations 3, 4.

The assembly steps of the magnet fixing structure for the conventional linear motor will now be explained.

The magnet M is appropriately inserted from outside the magnet paddle 1 into each of the magnet insert openings 1a formed in the periphery of the magnet paddle 1 which is connected to the piston (not shown). Then, the cylindrical magnet fixing ring 2 which is non-magnetic is attached under pressure onto the outer periphery (as shown in the drawing) or an inner periphery of the magnet M so as to prevent the magnet M from being deviated from or fluctuated by the magnet paddle 1. The upper and lower end portions of the magnet fixing ring 2 are bent toward the magnet paddle so that the magnet M can not be deviated from or fluctuated by the magnet paddle 1, thereby rigidly fixing the magnet M into the magnet paddle 1 without deviation or fluctuation during the high speed linear reciprocal movement in accordance with a magnet induced between the respective laminations 3, 4.

However, in the magnet fixing structure for the conventional linear motor, since the eddy current loss preventing slits are formed in the periphery of the magnet fixing ring toward an axial direction, the eddy current loss preventing slits may be widened toward a peripheral direction of the ring during the attachment of the magnet onto the outer periphery of the magnet, thereby deteriorating adhesivity thereof with the magnet. Further, the poor adhesivity may cause noise due to an undesirable fluctuation of the structure, thereby damaging the magnet.

SUMMARY OF THE INVENTION

The present invention is directed to overcoming the conventional disadvantages.

Therefore, it is an object of the present invention to provide a magnet fixing structure for a linear motor, capable of rigidly fixing a magnet into a magnet paddle by minimizing the widening of slits in the magnet fixing ring during the assembly of the linear motor while preventing the loss of eddy current occurring due to a magnet induced between respective laminations.

To achieve the above-described object, there is provided a magnet fixing structure for a linear motor according to the present invention having a plurality of magnets inserted into a magnet paddle connected to a piston, and a magnet fixing ring attaching the same onto the outer periphery of the magnets under pressure, which includes a plurality of eddy current loss prevent slits formed in slant along the periphery of the magnet fixing ring.

Further, to achieve the above-described object, there is provided a magnet fixing structure for a linear motor according to the present invention having a plurality of magnets inserted into a magnet paddle connected to a piston, and a magnet fixing ring attaching the same onto the outer periphery of the magnets under pressure, which includes a plurality of eddy current loss prevent pores formed along the periphery of the magnet fixing ring.

The features and advantages of the present invention will become more readily apparent from the detailed description given hereinafter. However, it should be understood that the detailed description and specific example, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

Figure 1A:
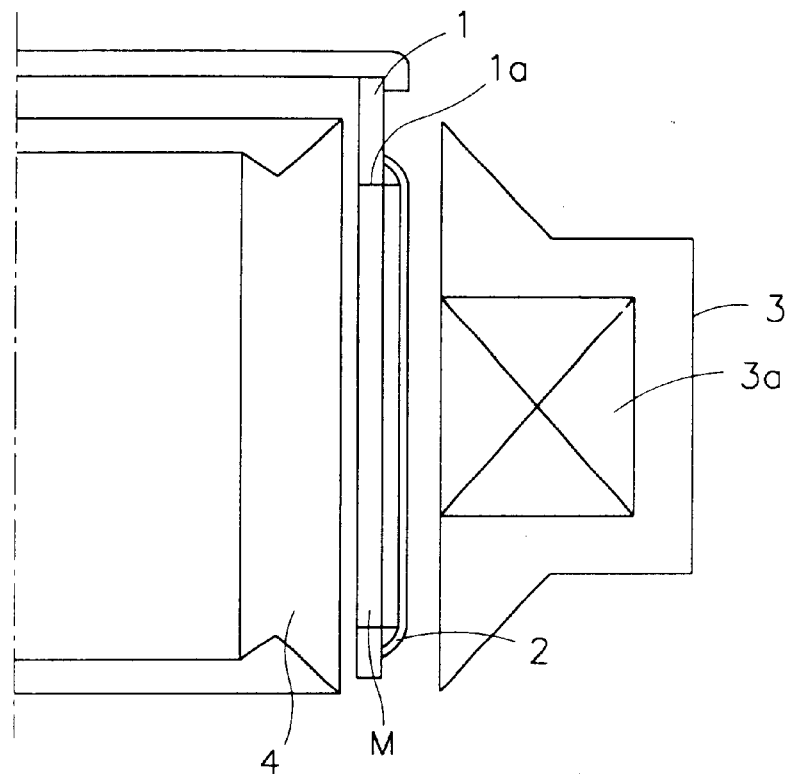
FIG. 1A is a schematic cross-sectional view of a conventional linear motor.

With reference to the accompanying drawings, the magnet fixing structure for a linear motor according to the preferred embodiments of the present invention will now be described, wherein same reference numerals are assigned to portions same to the conventional art.

Figure 1B:
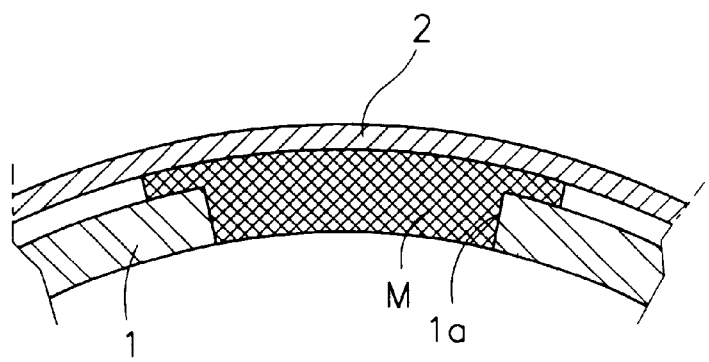
FIG. 1B is a partial cross-sectional view of a magnet fixing structure for the conventional linear motor.
Figure 2:
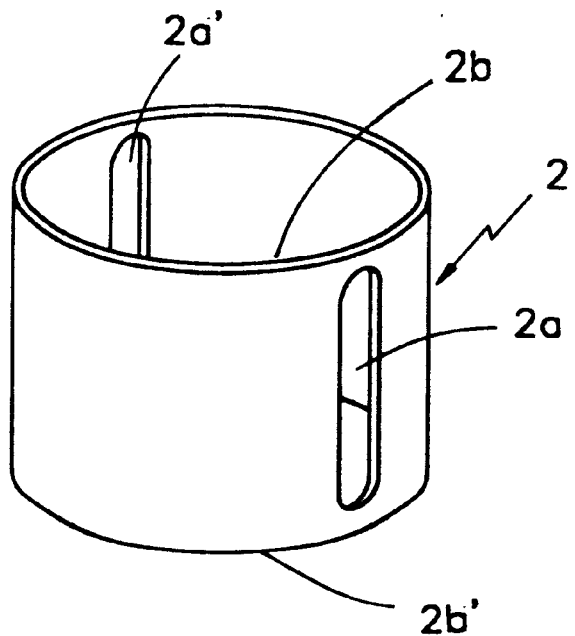
FIG. 2 is a perspective view illustrating a magnet fixing ring of the magnet fixing structure for the conventional linear motor.
Figure 3:
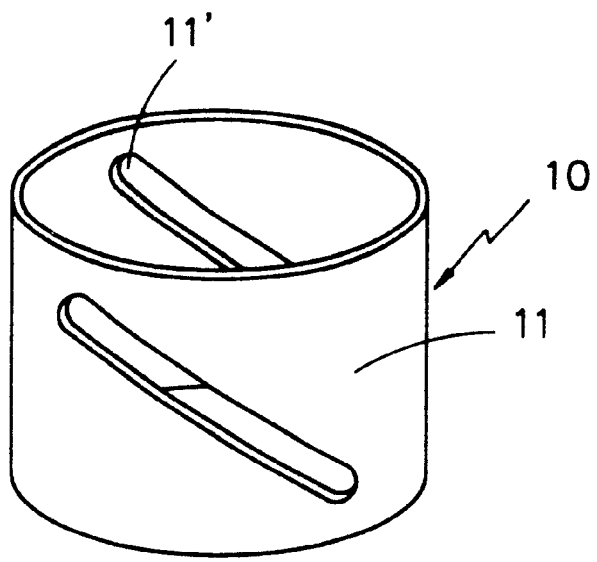
FIG. 3 is a perspective view illustrating a magnet fixing ring of a magnet fixing structure for a linear motor according to a first embodiment of the present invention.

As shown in FIG. 3, the magnet fixing structure for a linear motor according to the first embodiment of the present invention includes a plurality of magnets M (shown in FIG. 1) inserted into a magnet paddle 1 (shown in FIG. 1) connected to a piston (not shown). A magnet fixing ring 10 includes a pair of eddy current loss preventing slits 11, 11' formed in slant along the periphery thereof so as to facilitate the same onto the magnet M.

The assembly steps of the present invention are identical to those of the conventional art and their description will be omitted, accordingly.

A plurality of magnet insert openings 1a (shown in FIG. 1) formed in and along the outer periphery of the cylindrical magnet paddle 1 are respectively inserted thereinto by a magnet M. A thin and cylindrical magnet fixing ring 10 is attached onto the outer periphery of the magnet M under pressure. Upper end and lower end portions of the magnet paddle 1 are bent to prevent the same from being deviated from or fluctuated by the magnet paddle 1 when the magnet paddle 1 makes a high speed reciprocal movement in accordance a magnetic induced between respective laminations 3, 4 (shown in FIG. 1), thereby completing the assembly of the structure.

At this time, since the eddy current loss preventing slits 11, 11' formed on and along the periphery of the magnet fixing ring 10 are formed in slant, although the magnet fixing ring 10 is attached onto the outer periphery of the magnet M under pressure, the force to release the magnet fixing ring 10 along its peripheral direction is not induced along a perpendicular line of the magnet fixing ring 10, thereby minimizing the widening of the eddy current loss preventing slits 11, 11'

Figure 4A:
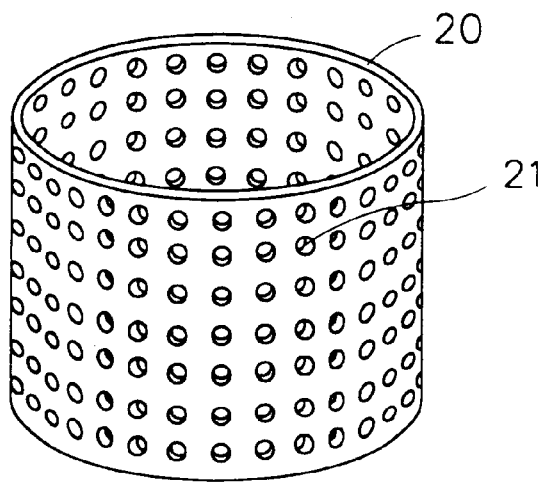
FIG. 4A is a perspective view illustrating a magnet fixing ring of a magnet fixing structure for a linear motor according to a second embodiment of the present invention.
Figure 4B:
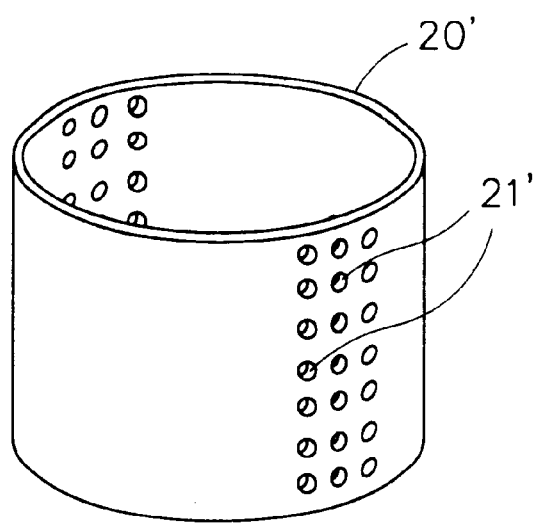
FIG. 4B is a perspective view illustrating a magnet fixing ring of a magnet fixing structure for a linear motor according to a third embodiment of the present invention.

Also, as shown in FIGS. 4A, 4B, the magnet fixing ring may includes a plurality of eddy current loss preventing pores formed in and along the periphery of the magnet fixing ring.

That is, according to the second embodiment of the present invention, as shown in FIG. 4A, the magnet fixing ring 20 may be entirely and uniformly punched to obtain a plurality of eddy current loss preventing pores 21. Also, according to the third embodiment of the present invention, as shown in FIG. 4B, a plurality of eddy current loss preventing pores 21' may be partially formed along peripheral portions which face against each other as seen, for example, in FIG. 4a, the pores.

The operation, assembly steps and effects of the thusly constituted magnet fixing ring according to the second and third embodiments are identical to the first embodiment, and will be omitted, accordingly.

As described above, the magnet fixing structure for a linear motor according to the present invention includes a plurality of eddy current loss preventing slits formed in slant along the periphery of the magnet fixing ring being attached onto the outer periphery of the magnet inserted into the magnet paddle under pressure, thereby minimizing the widening of the slits which may be caused by magnet fluctuation. Further, a plurality of eddy current loss preventing pores may be evenly formed in and along the entire periphery of the magnet fixing ring. Still further, a plurality of eddy current loss preventing pores may be partially formed in and along peripheral portions of the magnet fixing ring, wherein the peripheral portions face against each other so as to prevent the magnet from generating noise and being deviated from the magnet fixing ring, thereby significantly improving motor efficiency and reliability.

As the present invention may be embodied in several forms without departing from the spirit of essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within meets and bounds of the claims, or equivalences of such meets and bounds are therefore intended to embrace the appended claims.

What is claimed is:

1. A magnet fixing structure for a linear motor including: a plurality of magnets inserted into a magnet paddle connected to a piston, and a magnet fixing ring attached onto an outer periphery of the magnets under pressure, and a plurality of eddy current loss preventing pores formed along the periphery of the magnet fixing ring, none of said plurality of eddy current loss preventing pores extending substantially axially along the periphery of said magnet fixing ring and said eddy current loss preventing pores being spacedly located relative to one another, both along the axial and circumferential directions of the periphery of the magnet fixing ring.

2. The structure of claim 1, wherein the eddy current loss preventing pores are uniformly formed along the entire periphery of the magnet fixing ring.

3. The structure of claim 1, wherein the eddy current loss preventing pores are formed along peripheral portions of the magnet fixing ring and wherein the peripheral portions face against each other.

4. The structure of claim 1, wherein said pores are circular holes.

* * * * *